(12) United States Patent
Lai et al.

(10) Patent No.: US 8,797,733 B2
(45) Date of Patent: Aug. 5, 2014

(54) FASTENING MODULE

(75) Inventors: Wei-Chih Lai, Taipei (TW); Hsin-Hung Hsiao, Taipei (TW)

(73) Assignee: Pegatron Corporation, Taipei (TW)

( * ) Notice: Subject to any disclaimer, the term of this patent is extended or adjusted under 35 U.S.C. 154(b) by 156 days.

(21) Appl. No.: 13/463,811

(22) Filed: May 3, 2012

(65) Prior Publication Data

US 2012/0292468 A1 Nov. 22, 2012

(30) Foreign Application Priority Data

May 16, 2011 (TW) .............................. 100117100 A

(51) Int. Cl.
*G06F 1/16* (2006.01)

(52) U.S. Cl.
USPC ............ 361/679.33; 361/679.31; 361/679.37; 411/349

(58) Field of Classification Search
USPC .................. 248/221.11; 361/679.02, 679.33, 361/679.37, 679.39, 679.31, 679.35, 361/679.57, 679.58, 825; 411/340, 409, 411/349, 549, 553
See application file for complete search history.

(56) References Cited

U.S. PATENT DOCUMENTS

| | | | | |
|---|---|---|---|---|
| 3,986,780 A * | 10/1976 | Nivet | ............................ | 403/353 |
| 4,770,586 A * | 9/1988 | Osterland | ...................... | 411/349 |
| 6,771,496 B1 * | 8/2004 | Wu | ........................... | 361/679.58 |
| 7,102,885 B2 * | 9/2006 | Chen et al. | ................ | 361/679.31 |
| 7,336,482 B2 * | 2/2008 | Chen et al. | ................ | 361/679.33 |
| 7,542,277 B2 * | 6/2009 | Chen et al. | ................ | 361/679.31 |
| 7,543,786 B2 * | 6/2009 | Yang | ......................... | 248/222.51 |
| 7,611,100 B2 * | 11/2009 | Peng et al. | .................... | 248/27.1 |
| 7,830,656 B2 | 11/2010 | Ding | | |
| 7,922,144 B2 * | 4/2011 | Lee | ............................... | 248/694 |
| 8,456,831 B1 * | 6/2013 | Pang et al. | ............... | 361/679.33 |
| 8,465,221 B2 * | 6/2013 | Yan et al. | ...................... | 403/348 |
| 8,553,406 B2 * | 10/2013 | Liu et al. | .................. | 361/679.39 |
| 2005/0094369 A1 * | 5/2005 | Chen et al. | ..................... | 361/685 |
| 2006/0110235 A1 * | 5/2006 | Dembowsky et al. | ......... | 411/349 |
| 2006/0164803 A1 * | 7/2006 | Chen et al. | ..................... | 361/685 |
| 2007/0121285 A1 * | 5/2007 | Liang et al. | .................... | 361/685 |
| 2007/0268662 A1 | 11/2007 | Zhang et al. | | |
| 2011/0262243 A1 * | 10/2011 | Glickman | ...................... | 411/337 |
| 2012/0212899 A1 * | 8/2012 | Michael et al. | ........... | 361/679.37 |
| 2012/0292268 A1 * | 11/2012 | Lai et al. | ........................ | 211/26 |

FOREIGN PATENT DOCUMENTS

| | | |
|---|---|---|
| CN | 2303362 Y | 1/1999 |
| CN | 201298189 Y | 8/2009 |
| TW | 588234 | 5/2004 |
| TW | M331692 | 5/2008 |

* cited by examiner

*Primary Examiner* — Todd M Epps
(74) *Attorney, Agent, or Firm* — CKC & Partners Co., Ltd.

(57) ABSTRACT

A fastening module for fastening a data storage device is provided. The data storage device includes first and second positioning apertures. A frame of the fastening module includes a retaining hole, and first and second positioning holes. The data storage device is slidably received in the frame. A securing member of the fastening module includes a main body, a pivot member, and a pin. The main body includes a pivot hole pivotally connected by the pivot member. A securing piece of the pivot member passes through the retaining hole and rotates relative to the main body to fasten the securing member to the frame. When the securing piece passes through the retaining hole, the pin passes through either the first or second positioning hole and inserts into either the first or second positioning aperture to fasten the data storage device at different positions.

10 Claims, 4 Drawing Sheets

FASTENING MODULE

RELATED APPLICATIONS

This application claims priority to Taiwan Application Serial Number 100117100, filed May 16, 2011, which is herein incorporated by reference.

BACKGROUND

1. Technology Field

The disclosure relates to a fastening module, and more particularly, to a fastening module for fastening a data storage device.

2. Description of Related Art

Several kinds of approaches are used for fastening a data storage device (e.g., a hard drive, a CD-ROM drive, etc.) in a computer. The fastening approach frequently used involves directly fastening the data storage device to a housing of the computer by screws. With the progress in computer technologies, fastening devices that are convenient to fasten the data storage device have been developed.

A known fastening device is secured to a positioning frame of a housing of a computer by screws. A data storage device is fastened to the positioning frame by screws after the data storage device has been disposed in the positioning frame and threaded holes on two sides of the data storage device have been aligned respectively with openings on two sides of the positioning frame. Furthermore, when it is necessary to repair or replace the data storage device, the screws fastened to the data storage device and the positioning frame have to be removed first. Hence, with the conventional configuration, not only are screws required to fasten the positioning frame to the housing, but they are also required to fasten the data storage device to the positioning frame.

However, such an approach runs counter to efforts to reduce assembly time of the data storage device, and this has an impact on the overall assembly time of the computer. Ultimately, the cost of assembling the computer is increased. Furthermore, because there are various kinds of screws (e.g., I-shaped screws, X-shaped screws, star-shaped screws, etc.), many different kinds of screwdrivers must be provided to assemble or disassemble the data storage device.

SUMMARY

The disclosure provides an improved fastening module that is designed to improve the fastening mechanism between a data storage device and a frame.

The fastening module disclosed in the embodiment of the invention performs functions of assembling and disassembling by a securing member and the frame. When the securing member is assembled to the frame, pins on the securing member pass through positioning holes on the frame, so as to make the data storage device and the frame be positioned to each other. Furthermore, each of the positioning holes is aligned with the corresponding threaded hole on the data storage device, and each of the pins can pass through the corresponding positioning hole and the corresponding threaded hole, so as to position the data storage device at different positions relative to the frame. That is, the securing member provided in the embodiment may replace the conventional approach of fastening the data storage device to the frame by screws, so as to reduce the complicated processes and increase quantity of the fastening positions of the data storage device relative to the frame.

According to an embodiment of the invention, a fastening module is used for fastening a data storage device at different positions. The data storage device includes as least one first positioning aperture and at least one second positioning aperture. The fastening module includes a frame and a securing member. The frame includes a retaining hole, at least one first positioning hole, and at least one second positioning hole. The data storage device is slidably received in the frame, so as to align the first positioning hole to the first positioning aperture or align the second positioning hole to the second positioning aperture. The securing member includes a main body, a pivot member, and a pin. The main body includes a pivot hole. The pivot member is pivotally connected to the pivot hole and includes a securing piece. The securing piece is capable of passing through the retaining hole and rotating relative to the main body to fasten the securing member to the frame. The pin is disposed on the main body and fastens the data storage device at the different positions by being passed through the first positioning hole and inserted into the first positioning aperture or by being passed through the second positioning hole and inserted into the second positioning aperture when the securing piece is passed through the retaining hole.

In an embodiment of the invention, the main body includes at least one limiting portion for the securing piece to abut against, so as to limit the rotation of the securing piece relative to the main body within a predetermined angle.

In an embodiment of the invention, the frame includes a bulging portion that protrudes outwardly. The retaining hole is located at the bulging portion. When the pivot member and the frame form an interference fit, the securing piece is located between the data storage device and the bulging portion.

In an embodiment of the invention, the distance between the first positioning hole and the second positioning hole is different from the distance between the first positioning aperture and the second positioning aperture.

In an embodiment of the invention, the pivot member includes a rotary knob. The securing piece and the rotary knob are respectively located at two sides of the main body.

In an embodiment of the invention, the rotary knob is I-shaped.

In an embodiment of the invention, the retaining hole is located between the first positioning hole and the second positioning hole. The distance between the retaining hole and the first positioning hole is equal to the distance between the retaining hole and the second positioning hole.

In an embodiment of the invention, the frame includes an auxiliary positioning hole. The main body includes an auxiliary positioning pillar for inserting into the auxiliary positioning hole, so as to assist in the positioning of the securing member when the securing member is assembled to the frame.

In an embodiment of the invention, the length of the auxiliary positioning pillar is smaller than the length of the pin.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
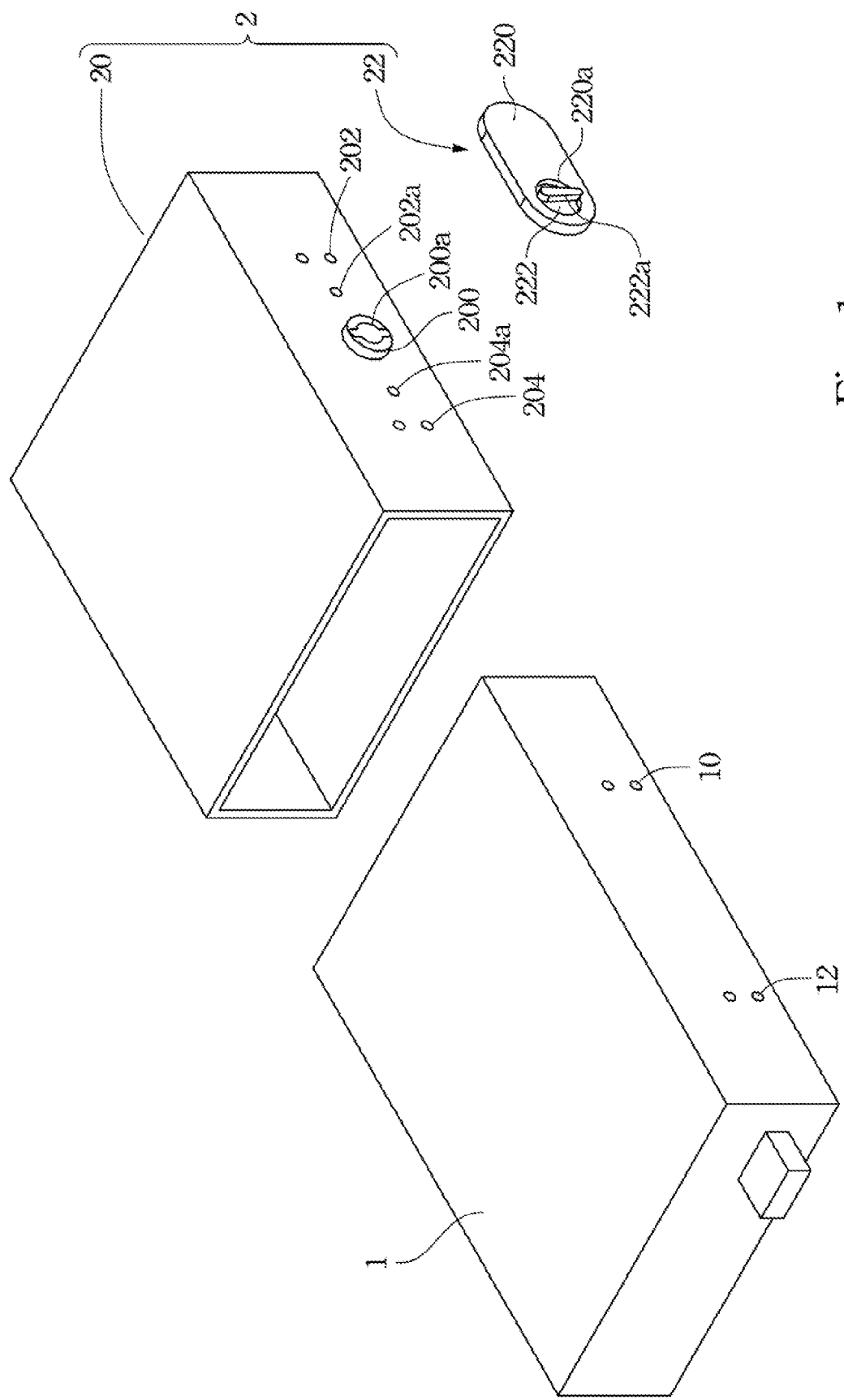
FIG. 1 is an exploded perspective view of a fastening module according to an embodiment of the invention, in which a data storage device is shown in a state outside of a frame.

Reference will now be made in detail to the present embodiments of the invention, examples of which are illustrated in the accompanying drawings. Wherever possible, the same reference numbers are used in the drawings and the description to refer to the same or like parts.

An improved fastening module is provided. Specifically, the fastening module is designed to improve the fastening mechanism between a data storage device and a frame. The fastening module disclosed in the embodiment of the invention enables assembly and disassembly using a securing member and the frame. When the securing member is assembled to the frame, pins on the securing member pass through positioning holes in the frame, so as to make the data storage device and the frame be positioned to each other. Furthermore, each of the positioning holes is aligned with a corresponding threaded hole in the data storage device, and each of the pins can pass through the corresponding positioning hole and the corresponding threaded hole, so as to position the data storage device at different positions relative to the frame. The securing member provided in the invention can replace the conventional approach of fastening the data storage device to the frame by screws, so as to eliminate the complicated processes associated with the conventional approach. Moreover, the fastening module of this disclosure allows for multiple fastening positions of the data storage device relative to the frame.

FIG. 1 is an exploded perspective view of a fastening module 2 according to an embodiment of the invention, in which a data storage device 1 is shown in a state outside a frame 20.

The fastening module 2 of the embodiment is used to fasten the data storage device 1 (e.g., a floppy disk drive, a hard disk drive, a CD-ROM drive, etc.) at different positions in the housing of a computer, but the invention is not limited in this regard. That is, the fastening module 2 of the invention can be used to fasten any electronic product that is typically fastened by screws. As long as there is a requirement to easily fasten the electronic product at different positions, the concepts of the invention can be applied to replace the complicated approach that utilizes screws.

As shown in FIG. 1, the data storage device 1 includes first positioning apertures 10 and second positioning apertures 12. The fastening module 2 includes a frame 20 and a securing member 22. The frame 20 of the fastening module 2 includes a retaining hole 200a, first positioning holes 202, and second positioning holes 204. The appearance of the data storage device 1 matches that of the frame 20 of the fastening module 2 and is such that the data storage device 1 can only slide along a single direction relative to the frame 20 after the data storage device 1 is received in the frame 20. During sliding the data storage device 1 relative to the frame 20 of the fastening module 2, the first positioning holes 202 of the frame 20 may be aligned respectively with the first positioning apertures 10 in the data storage device 1, or the second positioning holes 204 of the frame 20 may be aligned respectively with the second positioning apertures 12 in the data storage device 1, i.e., each of the second positioning holes 204 and the corresponding second positioning aperture 12 are communicated to each other.

Figure 2A:
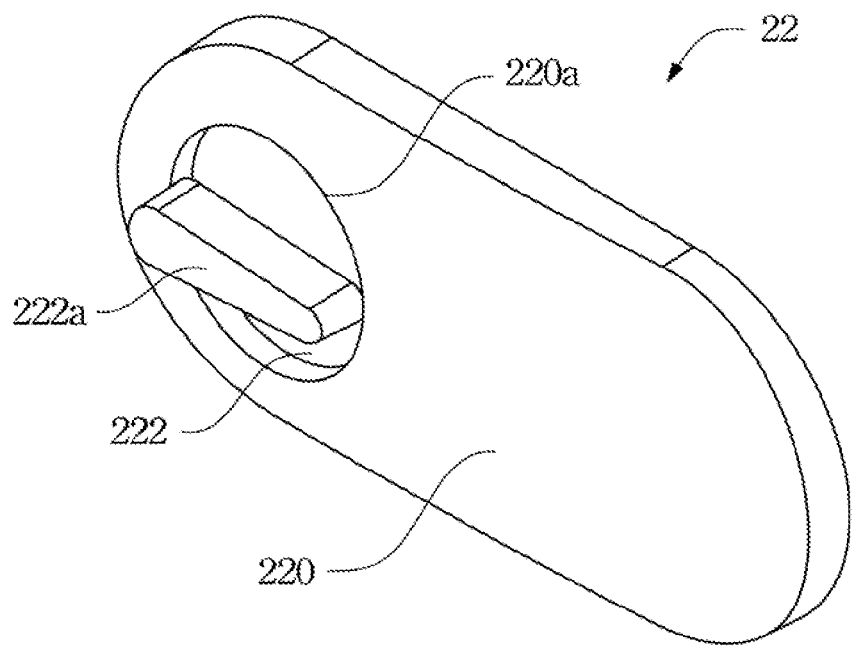
FIG. 2A is a perspective view of a securing member in FIG. 1.
Figure 2B:
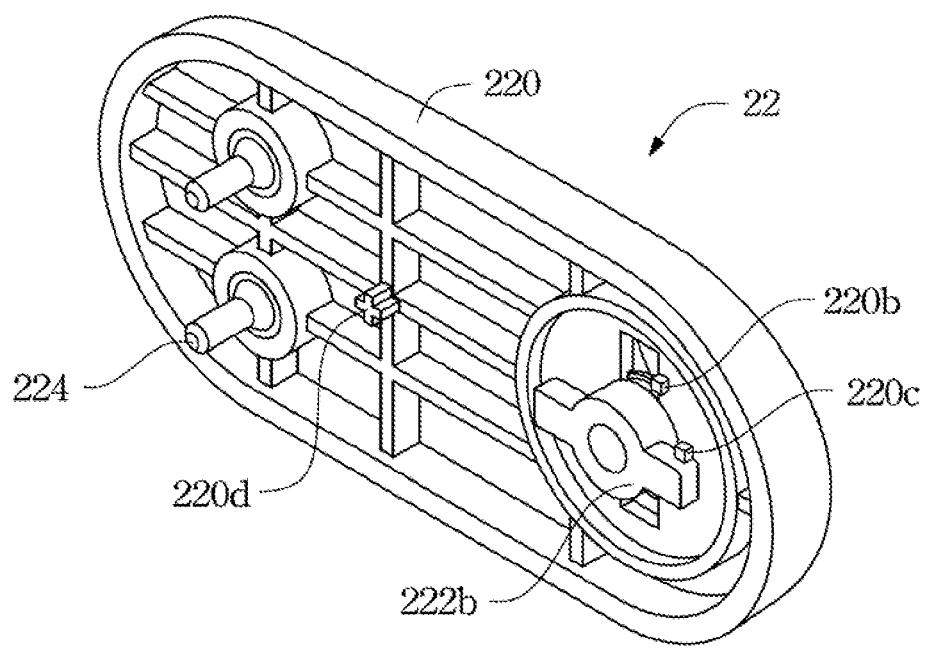
FIG. 2B is another perspective view of the securing member in FIG. 1.

FIG. 2A is a perspective view of the securing member 22 in FIG. 1. FIG. 2B is another perspective view of the securing member 22 in FIG. 1.

As shown in FIG. 2A and FIG. 2B, the securing member 22 of the fastening module 2 includes a main body 220, a pivot member 222, and pins 224. The main body 220 of the securing member 22 includes a pivot hole 220a. The pivot member 222 of the securing member 22 is pivotally connected to the pivot hole 220a and is therefore able to rotate relative to the main body 220. The pivot member 222 of the securing member 22 includes a rotary knob 222a and a securing piece 222b. The rotary knob 222a and the securing piece 222b of the pivot member 222 are respectively located at two sides of the main body 220, i.e., the rotary knob 222a and the securing piece 222b are respectively located at two opposite surfaces of the pivot member 222.

In the embodiment of the invention, the rotary knob 222a of the pivot member 222 is I-shaped, so that a user may easily rotate the rotary knob 222a, but the invention is not limited in this regard. In another embodiment of the invention, the rotary knob 222a of the pivot member 222 can be arc-shaped or can have a shape that is ergonomic.

As shown in FIG. 1 and FIG. 2B, the appearance of the securing piece 222b of the pivot member 222 corresponds to the retaining hole 200a in the frame 20, such that the securing piece 222b is able to pass through the retaining hole 200a. After the securing piece 222b of the pivot member 222 is passed through the retaining hole 200a of the frame 20 and rotated relative to the main body 220, the securing piece 222b of the pivot member 222 and the frame 20 form an interference fit so as to prevent the main body 220 of the securing member 22 from separating from the frame 20, i.e., the securing member 22 is fastened to the frame 20. In the embodiment of the invention, the frame 20 includes a bulging portion 200. The bulging portion 200 of the frame 20 protrudes outwardly, and the retaining hole 200a is located at the bulging portion 200. Therefore, after the securing piece 222b of the pivot member 222 is passed through the retaining hole 200a of the frame 20 and rotated relative to the main body 220, the securing piece 222b of the pivot member 222 is located between the data storage device 1 and the bulging portion 200, and the securing piece 222b of the pivot member 222 is engaged to the bulging portion 200 of the frame 20.

In the embodiment of the invention, the securing piece 222b of the pivot member 222 is shaped as a round piece with two segments protruding outward from the round piece at two opposite sides thereof so that the securing piece 222b can be engaged to the bulging portion 200 at two opposite edges of the retaining hole 200a, but the invention is not limited in this regard. In another embodiment, the securing piece 222b of the pivot member 222 is shaped with a single segment protruding outward from the round piece, so as to be engaged to the bulging portion 200 at one edge of the retaining hole 200a.

The pins 224 of the securing member 22 are disposed on the main body 220. When the securing piece 222b of the securing member 22 is passed through the retaining hole 200a, the pins 224 of the securing member 22 may be passed through the first positioning holes 202 of the frame 20 and inserted into the first positioning apertures 10 of the data storage device 1, or may be passed through the second positioning holes 204 of the frame 20 and inserted into the second positioning apertures 12 of the data storage device 1. Hence, the data storage device 1 may be fastened at different positions and is prevented from sliding relative to the frame 20.

The purpose of preventing the data storage device 1 from sliding relative to the frame 20 is achieved by selectively passing the pins 224 of the securing member 22 either through the first positioning holes 202 of the frame 20 and inserting the pins 224 into the first positioning apertures 10 of the data storage device 1 or through the second positioning holes 204 of the frame 20 and inserting the pins 224 into the second positioning apertures 12 of the data storage device 1. Additionally, in the embodiment of the invention, the securing piece 222b of the pivot member 222 is also used. That is, in addition to the pins 224 of the securing member 22 passing through the first positioning holes 202 of the frame 20 and inserting into the first positioning apertures 10 of the data storage device 1 or passing through the second positioning holes 204 of the frame 20 and inserting into the second positioning apertures 12 of the data storage device 1, the securing piece 222b of the pivot member 222 passes through the retaining hole 200a of the frame 20 and is engaged to the bulging portion 200. Through such a configuration, the purpose of preventing the data storage device 1 from sliding relative to the frame 20 can be truly achieved.

It is noted that in the foregoing configurations, the distance between the securing piece 222b and the pins 224 of the securing member 22 may essentially be equal to the distance between the retaining hole 200a and the first positioning holes 202 of the frame 20 and the distance between the retaining hole 200a and the second positioning holes 204 of the frame 20.

If it is desired to achieve the purpose of selectively fastening the data storage device 1 to the frame 20 at several different positions, the distance between the first positioning holes 202 and the second positioning holes 204 of the frame 20 must be different from the distance between the first positioning apertures 10 and the second positioning apertures 12 of the data storage device 1. In the embodiment of the invention, the distance between the first positioning apertures 10 and the second positioning apertures 12 of the data storage device 1 is larger than the distance between the first positioning holes 202 and the second positioning holes 204 of the frame 20, but the invention is not limited in this regard. In other words, in order to achieve the same purpose, the distance between the first positioning apertures 10 and the second positioning apertures 12 of the data storage device 1 can be smaller than the distance between the first positioning holes 202 and the second positioning holes 204 of the frame 20

Figure 3A:
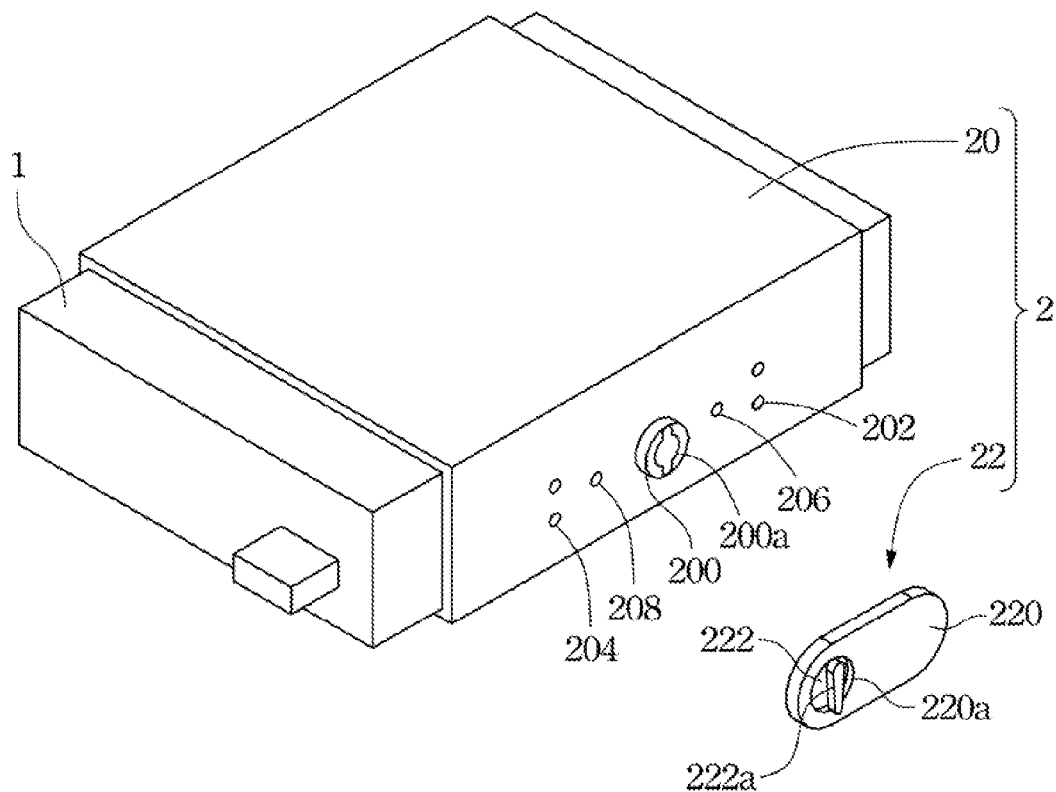
FIG. 3A is an exploded perspective view of the fastening module in FIG. 1, in which the data storage device is shown in a state received in the frame.
Figure 3B:
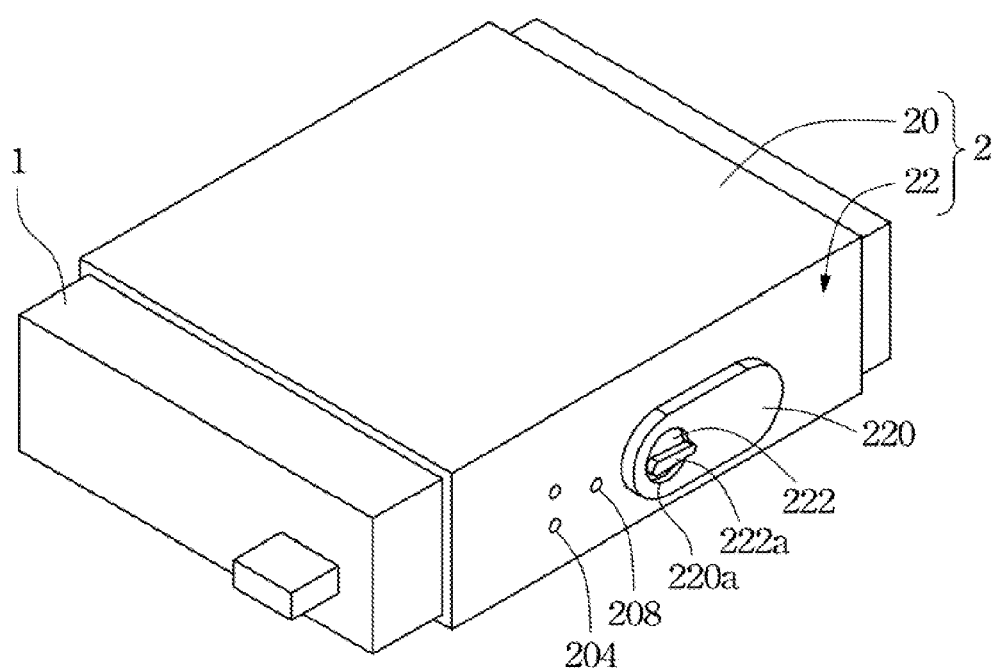
FIG. 3B is an assembled perspective view of the fastening module in FIG. 3A.

FIG. 3A is an exploded perspective view of the fastening module 2 in FIG. 1, in which the data storage device 1 is shown in a state received in the frame 20. FIG. 3B is an assembled perspective view of the fastening module 2 in FIG. 3A.

As shown in FIG. 3A and FIG. 3B, the data storage device 1 is received in the frame 20, and the first positioning apertures 10 of the data storage device 1 are aligned with the first positioning holes 202 of the frame 20. In addition, as shown in FIG. 3B, the securing piece 222b of the pivot member 222 is passed through the retaining hole 200a of the frame 20 and is engaged to the bulging portion 200, so as to achieve the purpose of preventing the main body 220 of the securing member 22 from separating from the frame 20. Moreover, the pins 224 of the securing member 22 are passed through the first positioning holes 202 of the frame 20 and inserted into the first positioning apertures 10 of the data storage device 1 so as to achieve the purpose of preventing the data storage device 1 from sliding relative to the frame 20.

As shown in FIG. 2B and FIG. 3A, in order to enhance stability and positioning accuracy when the securing member 22 is fastened to the frame 20, the main body 220 of the securing member 22 can further include an auxiliary positioning pillar 220d, and the frame 20 can further include an auxiliary positioning hole 202a. Therefore, when the securing piece 222b of the pivot member 222 passes through the retaining hole 200a of the frame 20 and the pins 224 of the securing member 22 pass through the first positioning holes 202 of the frame 20 and insert into the first positioning apertures 10 of the data storage device 1, the auxiliary positioning pillar 220d of the main body 220 is inserted into the auxiliary positioning hole 202a of the frame 20. In the embodiment of the invention, the length of the auxiliary positioning pillar 220d of the main body 220 is smaller than the length of the pins 224. In some embodiments, the length of the auxiliary positioning pillar 220d is equal to the thickness of the frame 20.

Figure 4A:
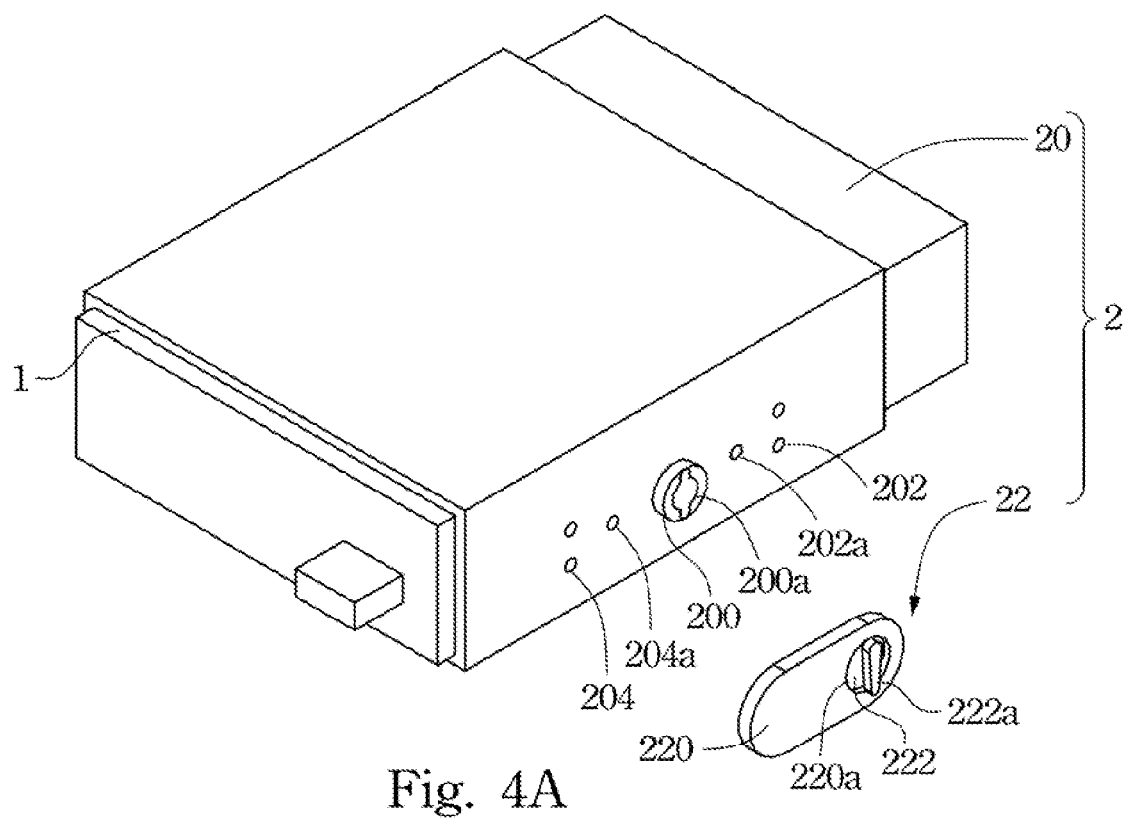
FIG. 4A is another exploded perspective view of the fastening module in FIG. 1, in which the data storage device is shown in a state received in the frame and positioned differently than in FIG. 3A.
Figure 4B:
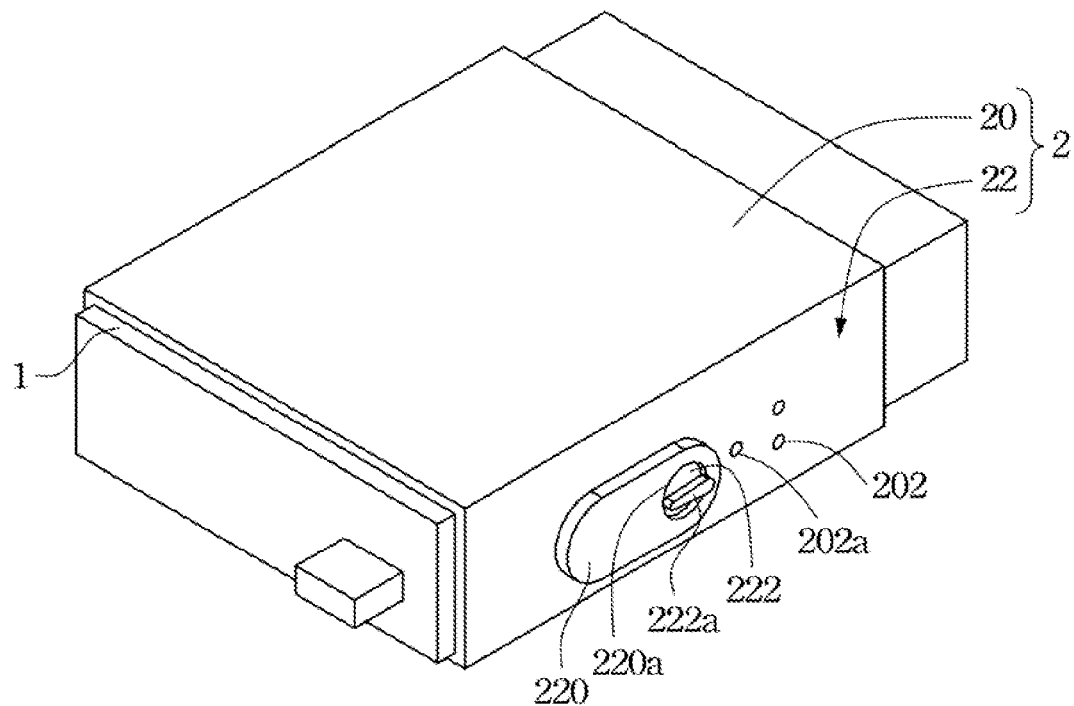
FIG. 4B is an assembled perspective view of the fastening module in FIG. 4A.

FIG. 4A is another exploded perspective view of the fastening module 2 in FIG. 1, in which the data storage device 1 is shown in a state received in the frame 20 and positioned differently than in FIG. 3A. FIG. 4B is an assembled perspective view of the fastening module 2 in FIG. 4A.

As shown in FIG. 4A and FIG. 4B, the data storage device 1 is received in the frame 20, and the second positioning apertures 12 of the data storage device 1 are aligned with the second positioning holes 204 of the frame 20. In addition, as shown in FIG. 4B, the securing piece 222b of the pivot member 222 is passed through the retaining hole 200a of the frame 20 and is engaged to the bulging portion 200, so as to achieve the purpose of preventing the main body 220 of the securing member 22 from separating from the frame 20. Moreover, the pins 224 of the securing member 22 are passed through the second positioning holes 204 of the frame 20 and inserted into the second positioning apertures 12 of the data storage device 1 so as to achieve the purpose of preventing the data storage device 1 from sliding relative to the frame 20.

As shown in FIG. 2B and FIG. 4A, in order to enhance stability and positioning accuracy when the securing member 22 is fastened to the frame 20, the main body 220 of the securing member 22 can further include the auxiliary positioning pillar 220d, and the frame 20 can further include an auxiliary positioning hole 204a. Therefore, when the securing piece 222b of the pivot member 222 passes through the retaining hole 200a of the frame 20 and the pins 224 of the securing member 22 pass through the second positioning holes 204 of the frame 20 and insert into the second positioning apertures 12 of the data storage device 1, the auxiliary positioning pillar 220d of the main body 220 is inserted into the auxiliary positioning hole 204a of the frame 20.

It can be seen that in order to achieve the purpose of selectively fastening the data storage device 1 to the frame 20 at several different positions, the securing member 22 of the fastening module 2 can be entirely rotated parallel to the sidewall of the frame 20 and the pins 224 of the securing member 22 can be made to pass through the first positioning holes 202 of the frame 20 and insert into the first positioning apertures 10 of the data storage device 1 (as shown in FIG. 3B) or pass through the second positioning holes 204 of the frame 20 and insert into the second positioning apertures 12 of the data storage device 1 (as shown in FIG. 4B). In the embodiment of the invention, the retaining hole 200a of the frame 20 is located between the first positioning holes 202 and the second positioning holes 204, but the invention is not limited in this regard.

In the embodiment of the invention, the data storage device 1 can be fastened to the frame 20 at two different fastening positions respectively by aligning the first positioning apertures 10 to the first positioning holes 202 and aligning the second positioning apertures 12 to the second positioning holes 204, but the invention is not limited in this regard. In another embodiment of the invention, the quantity of different positioning apertures of the data storage device 1 and the quantity of different positioning holes of the frame 20 can be increased as needed and in a manner utilizing the concepts of the invention, so as to achieve the purpose of fastening the data storage device 1 to the frame 20 at more than two different positions.

In the embodiment of the invention, the quantity of the first positioning apertures 10 and that of the second positioning apertures 12 of the data storage device 1, the quantity of the first positioning holes 202 and that of the second positioning holes 204 of the frame 20, and the quantity of the pins 224 of the securing member 22 are all two, so as to realize better fastening stability, but the invention is not limited in this regard and these quantities can be adjusted according to the requirements of design.

Furthermore, as shown in FIG. 2B, in order to limit the angle within which the pivot member 222 of the securing member 22 is rotated relative to the main body 220, the main body 220 of the securing member 22 can further include a limiting portion 220b and a limiting portion 220c. The securing piece 222b abuts against the limiting portion 220b and the limiting portion 220c, so as to limit rotation of the securing piece 222b relative to the main body 220 within a predetermined angle. In the embodiment of the invention, the securing piece 222b is able to pass through the retaining hole 200a of the frame 20 when the securing piece 222b of the pivot member 222 abuts against the limiting portion 220b, and securing piece 222b and the retaining hole 200a of the frame 20 form an interference fit when the securing piece 222b of the pivot member 222 abuts against the limiting portion 220c.

In the embodiment of the invention, the foregoing predetermined angle is 90 degrees, but the invention is not limited in this regard and can be adjusted according to the requirements of design or limitations of manufacture.

According to the foregoing recitations of the embodiments of the invention, it can be seen that the fastening module of the invention is designed to improve the fastening mechanism between a data storage device and a frame. The fastening module disclosed in the invention enables assembly and disassembly using a securing member and the frame. When the securing member is assembled to the frame, pins on the securing member can pass through positioning holes in the frame, so as to achieve the function of securing the data storage device and the frame to each other. Furthermore, each of the positioning holes can be aligned with the corresponding threaded hole in the data storage device, and each of the pins can pass through the corresponding positioning hole and the corresponding threaded hole, so as to position the data storage device at different positions relative to the frame.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A fastening module for fastening a data storage device at different positions, the data storage device comprising at least one first positioning aperture and at least one second positioning aperture, the fastening module comprising:
   a frame comprising a retaining hole, at least one first positioning hole, and at least one second positioning hole, wherein the data storage device is slidably received in the frame, so as to align the first positioning hole to the first positioning aperture or align the second positioning hole to the second positioning aperture; and
   a securing member comprising:
      a main body comprising a pivot hole:
      a pivot member pivotally connected to the pivot hole and comprising a securing piece capable of passing through the retaining hole and rotating relative to the main body to fasten the securing member to the frame; and
      a pin disposed on the main body and fastening the data storage device at the different positions by being passed through the first positioning hole and inserted into the first positioning aperture or by being passed through the second positioning hole and inserted into the second positioning aperture when the securing piece is passed through the retaining hole.

2. The fastening module of claim 1, wherein the main body comprises at least one limiting portion for the securing piece to abut against, so as to limit a rotation of the securing piece relative to the main body within a predetermined angle.

3. The fastening module of claim 2, wherein the predetermined angle is 90 degrees.

4. The fastening module of claim 1, wherein the frame comprises a bulging portion that protrudes outwardly, the retaining hole is located at the bulging portion, and when the pivot member and the frame form an interference fit, the securing piece is located between the data storage device and the bulging portion.

5. The fastening module of claim 1, wherein a distance between the first positioning hole and the second positioning hole is different from a distance between the first positioning aperture and the second positioning aperture.

6. The fastening module of claim 1, wherein the pivot member comprises a rotary knob, and the securing piece and the rotary knob are respectively located at two sides of the main body.

7. The fastening module of claim 6, wherein the rotary knob is I-shaped.

8. The fastening module of claim 1, wherein the retaining hole is located between the first positioning hole and the second positioning hole, and a distance between the retaining hole and the first positioning hole is equal to a distance between the retaining hole and the second positioning hole.

9. The fastening module of claim 1, wherein the frame comprises an auxiliary positionirm hole, and the main body comprises an auxihay positioning pillar for inserting into the auxiliary positioning hole, so as to assist in a positioning of the securing member when the securing member is assembled to the frame.

10. The fastening module of claim 9, wherein a length of the auxiliary positioning pillar is smaller than a length of the pin.

* * * * *